INVENTORS
W. LIMBERGER
W. SALGER
G. CRANSKENS

Karl F. Ross
AGENT

3,252,396
APPARATUS FOR MAKING COPIES
Walter Limberger, Hamburg-Poppenbuttel, Werner Salger, Hamburg, and Georg Cranskens, Wedel, Holstein, Germany, assignors to Lumoprint Zindler K.G., Hamburg, Germany, a corporation of Germany
Filed Oct. 10, 1963, Ser. No. 315,235
Claims priority, application Germany, Oct. 13, 1962, L 43,198
7 Claims. (Cl. 95—77.5)

This invention relates to an apparatus for making copies by using internally stored copying material including supply rolls of a transfer layer and a copy-receiving layer.

A prior apparatus of this type uses as an abutment surface for the original, or master sheet, a driven conveyor belt above which a hand lever is arranged to serve as an abutment-locking device. This hand lever is provided with a contact for switching-on an electric control including a programming drum for switching all the other elements of the apparatus on or off at the proper time. This known apparatus provides two tape-like copying materials, i.e. a transfer and an image-receiving material, stored on rollers each roller is provided with a respective cutting device. These cutting devices are also controlled by electric means.

Copying devices with electric controls are complex and expensive, since electric control elements not only require accurate workmanship in manufacturing but also maintainance and, in addition, the functioning may be impaired by ambient influences, for example by corrosion.

The introduction of the original on a moving conveyor belt, on which the original is initially maintained by the abutment surface, is afflicted with drawbacks in that the resulting friction may lead to damage of the original, particularly thin originals, if these are buckled on the abutment surface. In addition, if the original remains stationary on the moving conveyor belt for some length of time it is possible that the original may become charged electrostatically. Such charging may be of disadvantage in certain copying methods and may impede the subsequent separation of the original from a transfer material.

One object of the invention is, therefore, to provide an apparatus in which electric control elements are omitted and in which a timed control relative to the length of the sheet is achieved with mechanical means.

Another object of the invention is to provide an apparatus in which the original or master sheet is handled gently so as to avoid creasing and buckling.

These problems are solved according to the invention in that a movable part of the abutment-locking means is connected by mechanical connecting members to at least one feeding unit for feeding copying material, and that the feeding unit is engaged in dependence upon the movement of the abutment locking means and disengaged in the course of operation within the feeding unit.

According to a preferred embodiment of the invention a feeding unit for copying material is connectible to constantly moving conveying means by a coupling or clutch which is directly engaged in dependence upon the movement of the abutment-locking means. This constantly moving conveying means may readily be provided at any position in the apparatus so that by providing a coupling for each feeding unit a space-saving mechanical transmission is obtained.

In the preferred use of copying material stored in form of rolls, and of a cutting device for severing the copying material into sheets the invention provides that the feeding unit comprises two couplings arranged in series, the first of which is engageable in dependence on a switch-on movement of the abutment locking means for advancing the conveying means of the feeding unit through a distance corresponding to the length of the copying-material sheet, while the second coupling is engageable during a fraction of the engagement period of the first coupling for performing the cutting operation. The first coupling is again disengaged in dependence on an operating movement in the feeding unit, for example the slide movement of the cutting device, so that the duration of the coupling engagement also depends on the completion of the operation in the feeding unit. Thus by suitably selecting the transmission ratios the couplings allow changes in the lengths of the sheets since merely the ratio of the engaging time of both couplings or, if the engaging time is maintained constant the transmission ratio between the driven shaft of the first coupling and the conveying means of the feeding unit need to be altered.

According to a preferred embodiment, the abutment-locking means is formed by a pivotally arranged bridge which is connected with a supporting table by rod means and comprises lost-motion locking pins movable by gravity and extending into the path of movement of the original at two longitudinally spaced locations. This bridge may additionally carry between the locking pins a movable driven transport roller which is shifted into engagement with the master sheet in dependence upon the release of the abutment-locking means.

Another aspect of this invention resides in the provision of driven transmission train to which the feeding units for the copying materials may be coupled at different locations; one coupling of the second feeding unit is thus disengagebale in dependence on the movement of the slide of its cutting device whereby automatically the control operation is ended at the last phase of the operating movement.

In order to also allow processing of originals having the thicknes of cardboard a preferred embodiment of the invention provides that at the side remote from the abutment surface a collection table for the master is offset a trifle below the introduction table in order to guide the original on only a slightly curved path.

The introduction table and the collection table are then each arranged above a supply roll for the copying material and are pivotal so as to form locking levers for mounting the supply rollers, and are provided with levers spreading the transport rollers in the feeding units for introducing the copying material into th guide path and engaging an alignment stop up to which the copying material is to be introduced. By this arrangement the abutment surface and the collection table fulfill a double function since they are highly suitable as levers due to their accessibility from the outside.

Advantageously the tape-like copying material is looped around a roller through about 180°, the roller being disposed between the supply roll and the feed units in parallel relation to the axis of the supply roll, whereby lateral stiffness is obtained for the insertion.

The invention shall be described in detail hereinafter in connection with the accompanying drawings showing as an example one embodiment of the invention. This embodiment relates to an apparatus for making copies according to the diffusion method using one transfer material and one image-receiving material. For this purpose a liquid container is shown in the developing station. However, it is emphasized that the invention not only applies to the processing of copying materials in the process or in a dry method but also other copying methods in which one material or a plurality of materials are used.

In the drawing:

FIG. 1A is a detail view of the sheet-separating means;

Figure 1:
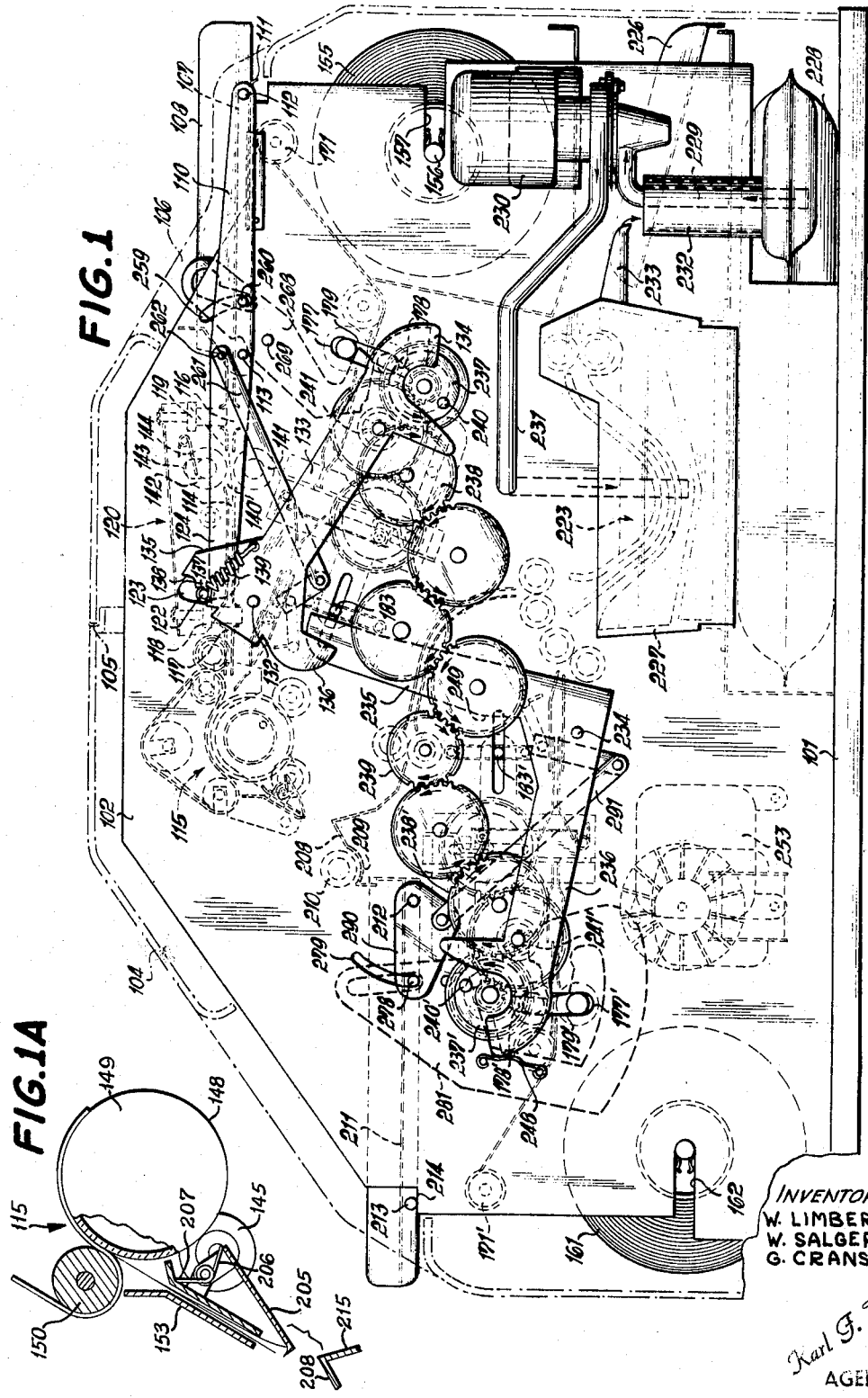
FIG. 1 is a schematic side view of an apparatus according to the invention.

The apparatus according to the invention comprises a mount with two side plates 102, 103 arranged on a base plate 101. The side plates 102, 103 serve to support members belonging to the apparatus. The mount is encased within a housing 104 shown in FIG. 1 only in dashed lines. This housing is, for example, divided in the middle perpendicularly to the plane of the drawing at 105 and may be removed toward both ends.

According to the invention a table-like supporting surface 107 for the original is arranged at one side of the housing and extends outwardly through an opening 106 therein. This supporting surface 107 has upstanding lateral flanges 108, 109. The table 107 is disposed between the side plates 102, 103 and is supported by the latter for pivotal movement on an axle 113. The supporting surface 107 has a pin 112 pivotally engaged by a double-arm pivot lever 110 (FIGS. 1 and 4) arranged outside of the side wall 102. A spring 111 is secured to the side wall 102 below the pivot pin 112 to yieldably maintain the supporting surface 107 and also the lever 110 in their rest positions (FIG. 1). The lever 110 is fulcrumed on the pivot axle 113.

Figure 3:
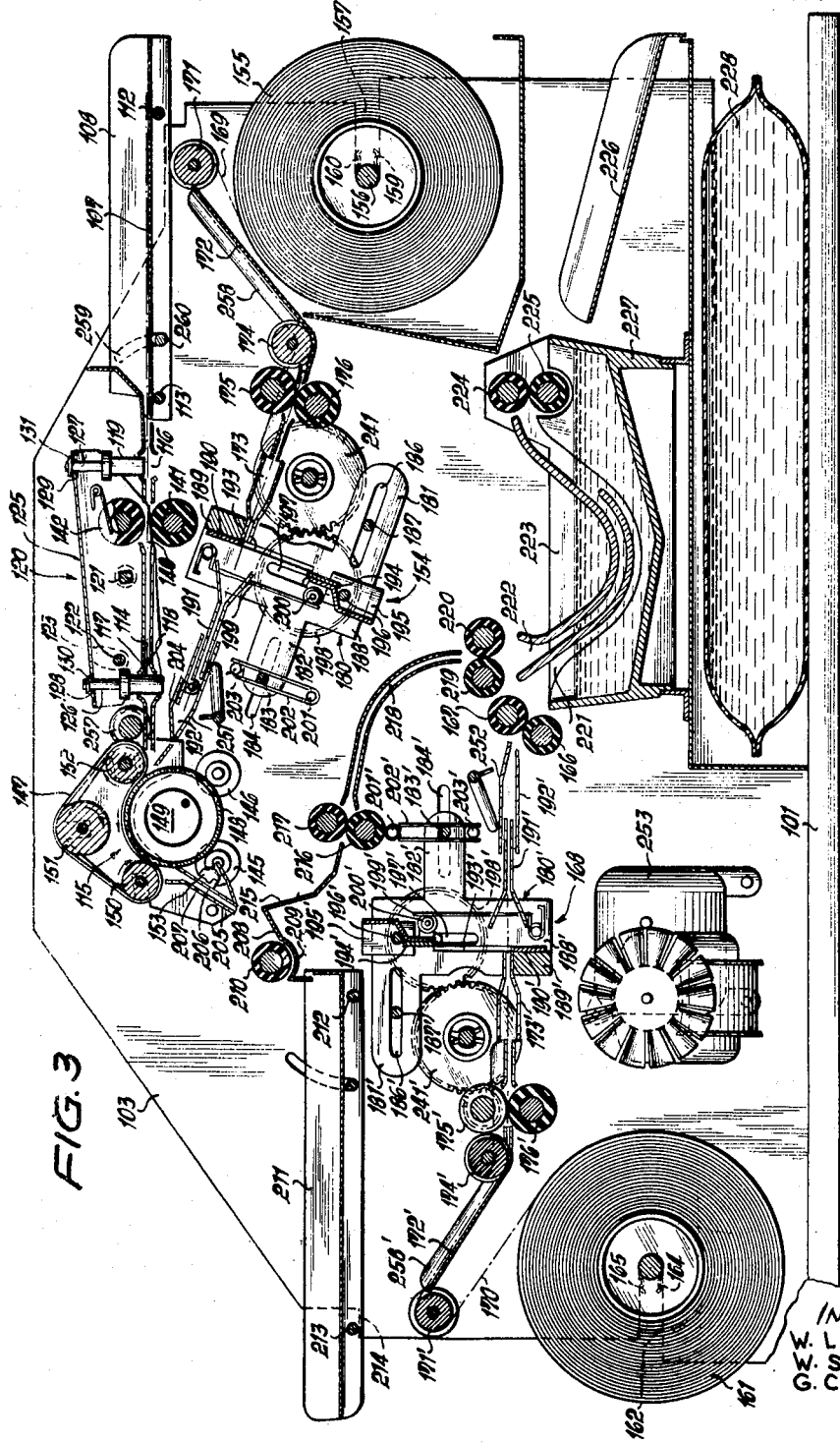
FIG. 3 is a schematic view corresponding to the view shown in FIG. 1 showing the structural parts arranged between the side walls of the mount.
Figure 4:
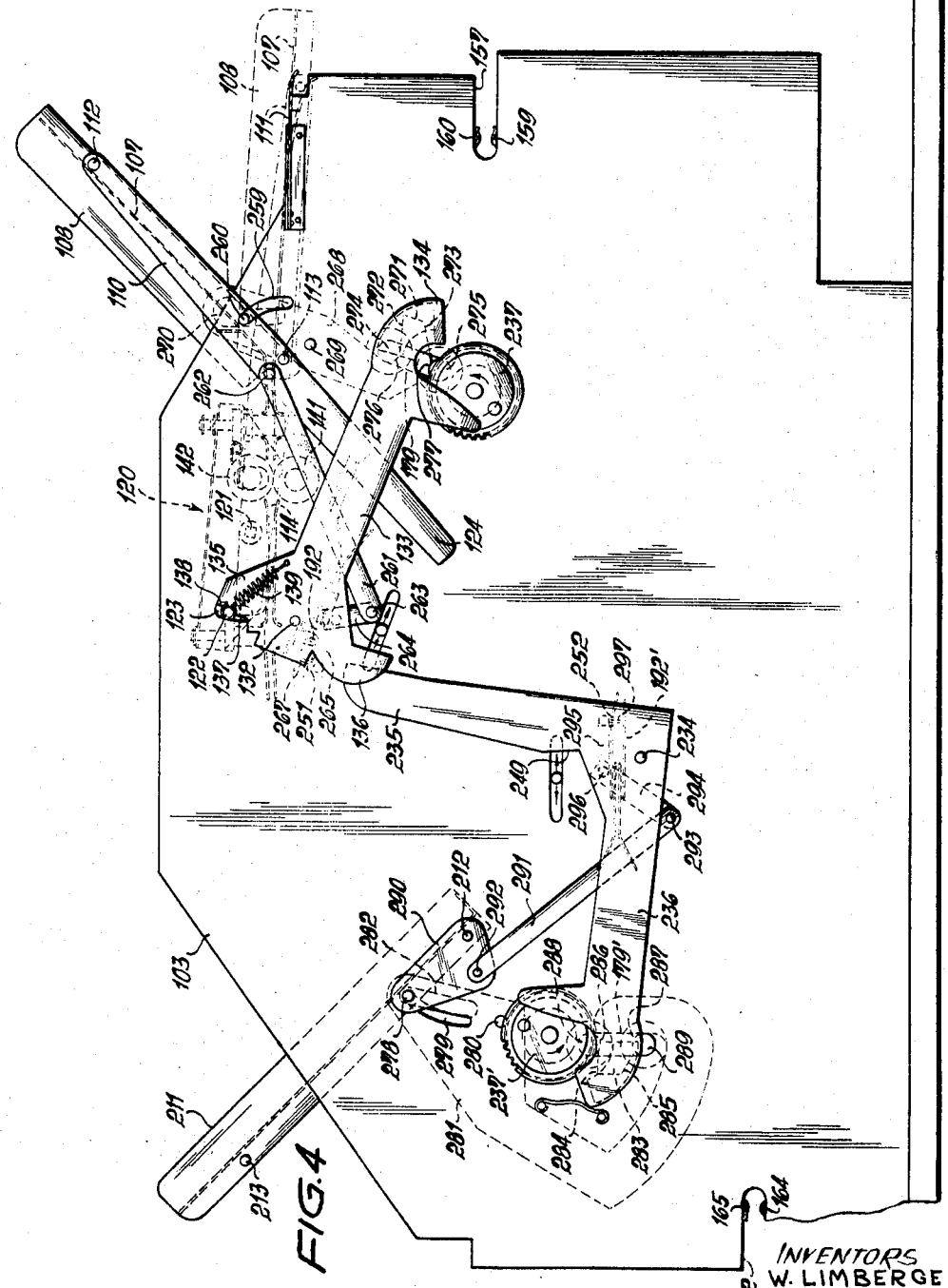
FIG. 4 is a view corresponding to FIG. 1 but merely showing the transmitting and locking lever-connecting link system.

The upper side of the supporting surface 107 is aligned with an input guide path 114 formed by upper and lower guide elements and leading to the inlet of an exposure means 115. Beyond the supporting surface 107 and in front of the exposure device 115 there are rows of apertures 116, 117 transverse to the guide path 114 and through which locking pins 118, 119 carried by abutment-locking means 120 may extend. The abutment-locking device 120 forms a pivoting bridge which may be oscillated about a pivot 121 in the side walls 102, 103. At the end of the bridge remote from the supporting surface 107, a pin 122 extends through a slot 123 formed in the side wall 102 and rests on the arm 124 of the pivot lever 110 (FIGS. 3 and 4). Upon movement of the pivot pin 112 downwardly the arm 124 is lifted, thereby pivoting the abutment locking device 120 in clockwise direction. The lost-motion locking pins 118, 119, which each represent respective locking-pin rows extending transversely to the plane of the paper, are freely guided in an upper plate 125 and extending with respective shanks 126, 127 through apertures 128, 129 in this plate; above the latter disk-like abutment elements 130, 131 define the lowermost position of the locking pins 118, 119 (see FIG. 3).

A locking lever 133 (FIGS. 1 and 4) is supported by the side wall 102 to pivot about a pivot axle 132 and cooperates via its lower right hand end 134 with a coupling 237 in a manner to be descirbed hereinafter; adjacent its pivot axis 132, it is formed with angular projections 135, 136. The projection 135 comprises two superposed recesses 137, 138 which cooperate with the pin 122. A tension spring 139 secured with one end to the locking lever 133 and with its other end to the pin 122 maintains the latter in engagement with one of the recesses 137, 138, thereby establishing the operative positions of the locking lever 133. An aperture 140 (FIG. 3) is formed in the guide path 114 between the locking pins 118, 119. A roller 141 rotatably supported by the side walls 102, 103 and constantly driven is arranged below the aperture 140. Arranged above this aperture 140 on the abutment locking device 120 is a constantly driven counter roller 142; the latter is supported in a vertically movable manner, for example in slots 143 (FIGS. 1 and 2) provided on either side in side walls of the abutment locking device 120. Roller 143 is urged downwardly, i.e. towards the guide path 114 and the roller 141 by a spring 144. When the abutment-locking device 120 is swung in a counterclockwise direction, as shown in FIGS. 1 and 3 the rollers 141, 142 are lifted out of mutual engagement, thereby forming a gap, while upon pivoting in a clockwise direction the rollers 141, 142 will drivingly engage each other.

The exposure device 115 consists of a radiation penetrable drum 148 rotatably supported between rollers 145, 146 and an endless driven belt 147. A radiation source 149 is arranged within the drum 148 (FIG. 3). The belt 147 is guided over rollers 150, 151, 152 driven in the direction indicated by the arrow shown in FIG. 3, whereby the drum 148 is entrained by the belt 147 in a counterclockwise direction. The inlet of the exposure device 115 is disposed at the end of the guide path 114 approximately between the roller 150 and the drum 148. The outlet of the exposure device 115 is disposed between the roller 150 and the drum 148. From this outlet the widened mouth of a guide path 153 is defined by guide elements.

Below the guide path 114, a cutting device for the transfer paper, generally indicated by the reference numeral 154, is arranged. The tape-like transfer paper is stored in form of a roll 155 having its shaft 156 removably supported in substantially horizontal slots 157, 158 formed in the side walls. The operating position of the roll is defined by groups of retaining springs 159, 160. The springs 159, 160 not only maintain the shaft 156 in its operating position but also act as friction brakes. The image-receiving paper is also provided in form of a tape and is stored on a roll 161 arranged in slots 162, 163 formed in the side walls 102, 103 and is likewise resiliently retained by groups of springs 164, 165.

With regard to the feeding of the transfer paper and the image-receiving paper substantially similar arrangements are provided between the rollers 155 and 161 and the above-described path 114 or a pair of transport rollers 166, 167 respectively on the other hand. The cutting device for the image-receiving paper is shown at 168.

Therefore, in the following description of the feeding arrangement for the papers like reference numerals are used for corresponding parts, in which the reference numerals pertaining to parts of the arrangement for the image-receiving paper are primed.

The feeding arrangement (FIG. 3) are arranged with respect to the rolls 155, 161 in such a manner that the paper tapes 169, 170 each pass upwardly and outwardly to a guide roller 171, 171′, and from this roller are reversed about 180° to a guide surface 172, 172′. This guide surface then curves to join the feed path 173, 173′ of the cutting devices 154, 168. Each paper tape is maintained in the zone of the respective curve by guide rollers 174, 174′ on the guide surface. Between the guide rollers and the cutting device driven transport rollers 175, 176, or 175′, 176′ respectively, are journalled in slot-like bearings 177, 178, or 177′, 178′ respectively, capable of being moved apart and resiliently urged together by biasing means, for example an endless helical garter spring 179, 179′ (FIGS. 1 and 4), which simultaneously forms the drive means therefor.

Each cutting device comprises a slide 180, 180′ movable in the direction of the feed path and formed by two wall sections guided within the side walls 102, 103. These wall sections include projections 181, 181′, 182, 182′ extending in the direction of the feed path. A guide rod 183, 183′ is supported in the projection 181, or 181′ respectively, extending at either side of the slide into slots 184, 185, or 184′, 185′ respectively and being guided therein with its ends. The projection 181, or 181′ respectively has a slot 186, 186′ through which a guide rod 187 supported in the side walls 102, 103 extends. The slide is positioned so that the slots 184 and 186, or 184' and 186' respectively, extend in mutually parallel relationship.

The movable slides include side walls 188, 188', only one of which is seen but it should be noted that adjacent each plate 102, 103 a respective slide side wall is guided. These slide side walls 188, 188', connected by the guide rods 183, 183' and a transverse beam 189, 189' which carries the stationary knife 190, 190' of the cutting device. The feed path 173, 173', widened at its outer end so as to overlap stationary guide elements, is arranged in the zone of the lateral beam 189, 189' flush with the cutting edge of the stationary knife 190, or 190' respectively. At the opposite side of the knife slide a run out path 191, 191' widens towards the stationary knife and is formed by two guide elements. The run out path extends into a guide path 192, 192' formed by stationary guide elements and leading to the inlet of the exposure device, or to the transport rollers 166, 167 respectively.

The slides 180, or 180' respectively, include guides 193, 193' arranged in parallel relation to the stationary knife 190, 190' and serving to guide the movable knife 194, 194' which is resiliently urged toward the stationary knife. The movable knife is mounted on a knife carrier 195, 195' including outwardly extending pins 196, 196' which pass through slots 197, 197' formed in the side walls of the slides. The slots 197, 197' extend transversely to the slots 184, 186, or 184', 186' respectively. The pins 196, 196' are further connected outside the side walls 188, 188' of the cutting devices to crank wheels 198, 198' rotatably supported in the plates 102, 103. Thus upon rotation of these crank wheels the movable knife is positively shifted on the guides 193, 193' and the entire slide is reciprocated along to the slots 184, 186, or 184', 186' respectively.

A resiliently deflectable guide guide rail 199, 199' on which moves a roller 200, 200' which is carried by the knife carrier is mounted on the side walls of the slide and serves to smoothly guide the movable knife.

Further, a double-armed spring 202, 202' is mounted by pins 201, 201' on the side walls 102, 103 of the mount, the arms of which extend on both sides of the guide rod 183, 183' and terminate on both sides at pins 203, 203' fixedly mounted on the lateral plates 102, 103.

By means of this arrangement the individual arms of the spring 202, 202' may deflect in the direction of movement when the respective slide is reciprocated whereby the spring arms are tensioned and prepared to cause a resilient return movement to the mid position. At the end facing the exposure device 115 the guide path 192 is closed by a flap-like guide element 204 which, if engaged by an advancing sheet, is lifted and prevents the exit of rays out of the exposure device 115.

The guide path 153 at the outlet of the exposure device is temporarily closed by a pivoting hook 205 (FIG. 1A) serving as separating element, which may pivot about the axis 206 in counterclockwise direction, when a leading edge of a sheet moves into the hook. A spring 207 serves to resiliently maintain the hook in the position shown in the drawing.

Below the lower mouth of the guide path an upwardly extending guide surface serving as separating wedge is arranged; one side of the wedge, as seen in FIG. 1, is inclined towards a recess 209 at the left hand side, above which a driven roller 210 rotates. The receiving or collection table 211 for the original is arranged to pivot about an axle 212 journalled in the side walls 102, 103 of the mount, and is supported adjacent its outer end, which extends out of the housing 104, by supporting pins 213 engaging shoulders 214 formed on the side walls 102, 103. The table 211 extends over the supply roll 161 for the image-receiving paper. At the right hand side the guide surface 208 slopes from the apex at 215 relatively steeply and leads to the gap between the driven transport rollers 216, 217. A curved guide path 218—between the side walls 102, 104 of the amount—extends from these transport rollers and is formed by two spacedly arranged guide elements. This guide path terminates at a constantly driven pair of transport rollers 219, 220, which, corresponding to the pair of transport rollers 166, 167, is arranged, in front of the inlets 221, 222 of a developing device. Disposed at the outlet of the developing device which is supported between the side walls 102, 103 of the mount, is a pair of conventional squeezing and transporting rollers 224, 225, contacting each other along a substantially horizontal tangent and being driven in the direction indicated by the arrow (FIG. 3). At the right hand side of this pair of transporting rollers, as viewed in FIG. 3, a run out path 226 slopes downwardly and leads to an opening in the housing through which the copy is dispensed.

For the sake of completeness it is pointed out that a supply container 228 for developing and stabilizing liquid is provided in the developing device. This supply container communicates via a duct 229, a pump 230, and a duct 231 with a sump of the bath container 227. The duct 229 is surrounded by a nipple 232 communicating with the supply container and opens into an overflow 223 of the bath container. The pump may be switched on with the apparatus.

A bell-crank lever 235, 236 is pivotally supported by a shaft 234 in the side walls 102, 103. One arm 235 of the bell crank lever extends into the path of movement of the guide rod 183, while its other arm 236 cooperates with a coupling 237' in a manner to be described. Further, it should be noted that the projection 136 of the locking lever 133 also extends into the path of movement of the guide rod 183, which reciprocates with the slide of the cutting device 154. However, it is pointed out that in the illustrated position the projection 136 is further spaced from the mid-position of the guide rod 183 than the arm 235 of the bell crank lever.

The coupling with which the end 134 of the locking lever 133 cooperates is shown at 237, and the corresponding coupling with which the arm 236 of the bell crank lever cooperates is seen at 237'. The couplings 237, 237' serve to actuate the transport rollers 177, 178, or 177', 178' respectively. They are drivingly connected in a manner not illustrated with a constantly driven gear 238, 238' which is driven via the intermediate gears shown in FIG. 1 by the gear 239. A rotating disc of the coupling carries an axially extending coupling pin 240, 240' cooperating with a cam at the end 134 of the locking lever, or at the end of the arm 236 of the bell crank lever respectively; the couplings are engaged when the coupling pins 240, 240' are released. It should further be noted that the arrangement is such that the counter part of the coupling pin can engage thereon only in a predetermined angular position of the coupling pin, so that the cam at the end 134, or at the arm 236 respectively, need only be relatively short in order to effect a constant idling of the coupling. If, after introducing an original, the abutment surface 107 is depressed at its right and end as viewed in FIG. 1 the pivoting lever 110 is simultaneously pivoted in a clockwise direction, whereby the pin 122 is raised. This causes, in a manner to be described, the abutment locking device 120 to pivot; in the raised position the locking lever 133 may pivot in a clockwise direction, whereby its recess 138 engages the pin 122. This engagement is caused by the spring 139. The cam at the end 134 moves out of the path of movement of the coupling pin 240, whereby the coupling is engaged.

The engaged coupling not only drives the transport rollers 177, 178 for the duration of engagement but also provides controlled movement for a predetermined time via a coupling 241 of the crank wheel 198 for the displacement of the movable knife 194 as well as the slide 180 of the cutting device. The intermediate gears are designated 242 and 243. The gear 244 connects the coupling 237 with the transport roller 178. It should be noted that this transport roller 178 drives the transport roller 141 via the gear 245, an intermediate gear 246 and a gear 247, whereby the transport roller 141 is driven in accordance with the operation of the drive for the advance of the transfer paper.

The transmission ratios and engagements of the couplings are set such that the cutting device 154 is only actuated during a predetermined end part of the operation of the transport rollers 175, 176. These transport rollers, for example, will make four complete revolutions for one working cycle in which the actuation of the cutting device only takes place during the last revolution.

During this working phase the crank wheel 198 rotates in a counterclockwise direction, whereby the slide, if viewed in FIGS. 1 and 3, first moves towards the right and then towards the left. The guide rod 183 participates in this reciprocating movement which, upon moving out of its mid-position towards the left, i.e. away from the cutting position, initially causes the bell crank lever with the arms 235, 236 to pivot in a counterclockwise sense since it engages the arm 235.

The operation of the coupling 237' and the transport rollers 175, 176 as well as the additional coupling 241' for the cutting device 168 is the same as the operation of the above described members. However, it should be noted that the end of the arm 236 carrying the cam for the coupling pin 240' cooperates with a spring 248 secured to the side wall 102 and resiliently defines both positions of the bell crank lever.

The crank wheel 198' rotates, as viewed in FIG. 3 in the counterclockwise direction, whereby the slide 180' initially moves towards the left and then towards the right. When moving towards the right the guide rod 183' entrained with the slide engages an abutment 249, whereby the bell crank lever is returned into the position shown in FIG. 1 in reponse to the operation of the cutting device for the image receiving paper, in which position the coupling 237 is disengaged. At this time the slide of the cutting device 154 has come already to rest, whereby the bell crank lever may occupy the position shown in FIG. 1.

Figure 2:
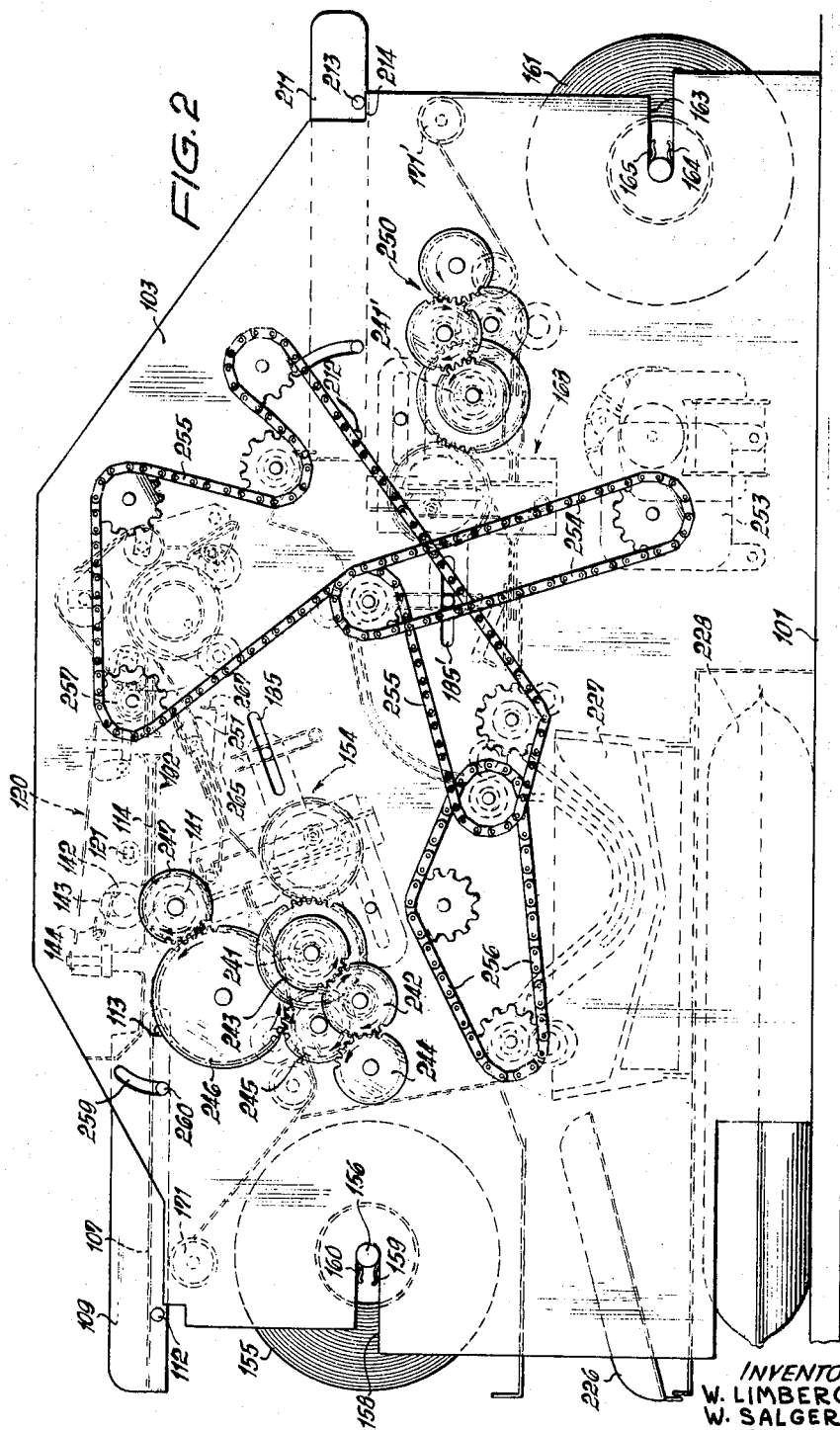
FIG. 2 is a side view of the apparatus seen from the opposite side.

In FIG. 2 the drive transmission of the coupling units 237' and 241' is denominated generally with 250 in which the meshing gears are indicated by adjacent arrows.

FIG. 2 shows the apparatus in its starting position, in which an original may be introduced and pushed against the locking pins 118. The image transfer paper is moved with its forward end so far that it is positioned only a little closer to the inlet of the exposure device than the forward edge of the original. Said edge of the image transfer paper is positioned approximately in the zone of the slot 251 in the guide path 192.

Now, if the abutment surface is depressed the abutment surface locking device 120 is pivoted in a clockwise direction as previously described already. Thus the locking pins 119 are supported on the upper surface of the original. The gap between the transport rollers 141, 142 is closed and the locking pins 118 are raised out of the path 114.

Simultaneously the coupling 237 is engaged by the aforementioned pivotal movement of the locking lever 133, whereby the image-transfer paper is advanced and the drive of the transport rollers 141, 142 is started. After a duration of time corresponding to the length of the sheet the cutting device 154 is actuated and severs a length of the image-transfer paper, the cutting operation being synchronized in such a manner that the edge of the paper tape still connected with the roll 155 substantially moves to the slot 251 before it comes to rest and before the drive of the constantly rotating parts is switched on, so that the original and the image transfer paper are moved through the exposure device. Since the forward edge of the transfer paper is somewhat advanced relative to the original (leading-edge relationship), it is moved by the pivotal hook 205 (FIG. 1A) upon the guide surface 215, and is advanced by the pair of transport rollers, while the original proceeds to the roller 210 and the collection table 211.

When the guide rod 183 actuates the bell crank lever with the arms 236, 253 it also engages the projection 136 of the locking lever 136, and this causes the release of recess 138 from the pin 122 against the force of the spring 139. The pin 122 drops into the slot 123 at the same time releasing the tension of the spring, i.e. the abutment locking device 120 again occupies the position shown in FIG. 1 and, by the pivoting of the locking lever 133, the coupling 237 is disengaged. Now a new original may be pushed against the locking pins 118. The locking pins 119 serve to prevent the introduction of a new original as long as the previously introduced original is processed in the apparatus during the initiated working cycle, i.e. as long as the transport roller 141, 142 occupy their closed position and are being driven.

Then, in dependence on the movement of the cutting device 154 the feeding of the image transfer paper is controlled in the already described manner in which the leading edge of the image-transfer paper is positioned adjacent the slot 252 of the feed path 192'. The length of the movement paths of the individual papers are dimensioned in such a manner that the papers pass together through the developing device and are dispensed in superimposed position on the guide path 226.

The drive motor 253 constantly drives, for example via chain-like transmission elements 254, 255, 256, the pairs of rollers 166, 167, or 216, 217, or 219, 220, or 224, 225 respectively, the roller 210 and the rotating parts of the exposure device 115, as well as the feed roller 257 of the exposure device. The individual drive wheels or gears are shown in FIG. 2 but not designated individually. The drive motor the radiation source of the exposure device are switched-on simultaneously.

An important feature of the invention must be seen in the fact that the gear 239 is constantly driven by the shaft of the roller 216 which is rotated by the drive belt 254. The gear 239 drives via gear trains, the coupling 237 and the coupling 237' so that the apparatus is provided with a constant-drive train to which the required elements for feeding the copying papers in accurately timed relation are mechanically coupled.

Further, it is to be noted that the guide surfaces 172 and 172' include lateral flanges 258, 258' projecting upwardly at right angles to the plane of the guide surface, and that portions of the transport rollers 175, 176, or 175', 176' respectively, which engage one another are of lesser width than the paper tape, or the guide surfaces respectively. These portions are, with respect to the lateral flanges 258, 258', displaceable on the axles of the rollers in such manner that the paper sheets are automatically guided along the lateral flanges 258, 258', whereby lateral movement is prevented, particularly in connection with the 180° loops around the guide rollers 171, 171'.

FIG. 4 shows the means for exchanging the supply rolls 155 and 161 in a simple manner. The arrangement is shown in the same side view as FIG. 3. The slots 157 and 162 for receiving the supply rolls are recognizable.

The suitability of such apparatus in offices largely depends on the simplicity of exchanging the paper rolls. In that it is further required that the paper tapes may be placed positively in the correct positions to start working.

According to the invention the abutment surface 107 and the collection table 211 are designed to form locking levers for exchanging the rolls. Prior to exchanging the rolls the housing 104 is removed. Then, for exchanging the supply roll 155 the abutment surface 107 is pivoted in a counterclockwise direction through substantially 45° whereby the pivot lever 110 is taken along (FIG. 4). The pivoting movement takes place around the pivot pins 113. Slots 259 are provided in the side walls 102, 103 to guide the movement of a pin 260 which, for example, is arranged on the abutment surface 107, or only on one side of the lever 110 respectively.

Additionally a push rod 261 pivotal about a pin 262 is arranged on the pivot lever 110. This push rod is pivotally connected by a pin 263 with the pivot arm 264 of a pivot hook 265 mounted angularly on the pivot arm. The unit 264, 265 is pivotally supported on a pin 266. The pivot hook 265 includes a projection 267 extending through the already mentioned aperture 251 of the feed path 192 into the same and blocking it.

Further, a roller-spreading lever 268 is pivotally supported by pivot pins 269 in the side wall 103 of the mount. This lever 268 has one one side of the pivot pin 269 a profiled aperture 270 into which the pin 260 extends for pivoting the lever 268 upwardly in a counterclockwise direction in dependence on pivoting the abutment surface 107. The other end of the spreading lever 268 is with hook-like formation 271. The hook formation 271 has two flanks 272, 273 extending divergingly from the forward end, and engaging between the axles 274, 275 of the rollers 175, 176, thereby spreading the same according to the bearing slots 177, 178 and the elasticity of the drive element 179. At the ends of the hook projection the flanks 272, 273 are provided with recesses 276, 277 serving to receive the roller axles 274, 275 under the tension of the elastic drive element 179, whereby the spreading lever 268, the abutment surface 107, and the pivot hook 265 are maintained in the position shown in FIG. 4. Thus, upon mounting a new roll of transfer paper, the forward end may readily be placed on the guide roller 171, guided around and below the guide roller 174 and passed through between the transport rollers 175, 176 up to the engagement on the projection 267 which can easily be sensed when introducing the paper tape.

Now, if the abutment surface 107 is returned to the position shown in FIG. 1 the spreading lever 268 is disengaged, the transport rollers 175, 176 engage the introduced paper, and the pivot hook 265 and the projection 267 are raised out of the feed path 192.

A guide pin 278 is secured to the depot table which is pivotal about the pin 212. The guide pin 278 is movable in slots 279 arranged in the side walls 102, 103 concentrically with the pin 212. A spreading segment 281 is pivotally suspended by the pivot pin 280 mounted in the side wall 103 and, at its one end, having a slot 282 receiving the pin 278. The other end of the spreading segment has a hook projection 283 with gradually diverging flanks 284, 285 having recesses 286, 287 formed in their ends. This hook projection is urged, corresponding to the action of the hook projection 271, between the axles 288, 289 of the transport roller 175', 176' when the spreading segment 281 is pivoted in clockwise direction. The transport rollers, 175', 176' are movable apart against the tension of a resilient element 179'. Also in this case the recesses 286, 287 serve to lock the parts in the roll-changing position.

In addition a lever plate 290 is secured to the depot table 211 and connected by a rod 291, which is pivotally suspended by pins 292, 293, to the pivot arm 294 of the pivot hook. This assembly unit 294, 295 may pivot about the pin 296 mounted in the side wall 103 of the mount. The pivot hook 295 carries the projection 297 which is moved through the aperture 252 into the feed path 192' to block this feed path. Now the roll may easily be exchanged and the new paper tape may be passed over the guide roller 171', then below the guide roller 174' and through between the transport rollers 175', 176' against the projection 297. By the return movement of the depot table 211 the hook projection 213 is released from the roller axles 288, 289 and the parts return to the position shown in FIG. 1.

We claim:
1. In an apparatus for making a copy of a master sheet by producing an image on a further sheet and including
    (a) a housing,
    (b) exposure means in said housing,
    (c) guide means in said housing forming an input path for the master sheet from an inlet provided in said housing to said exposure means,
    (d) a first table at said inlet for delivering said master sheet to said input path,
    (e) a supply roll of said further sheet in continuous form removably mounted in said housing proximal to one of said tables,
    (f) a second table at an outlet of said housing for receiving said master sheet upon passage by said exposure means,
    (g) means in said housing forming a transport path for drawing said further sheet in continuous form from said roll to a location in which an image of the master sheet is formed on said further sheet, said transport path being provided with severing means for forming individual lengths of said further sheet prior to the recipt of an image thereby, and
    (h) means including said exposure means for transferring an image of said master sheet to the individual lengths of said other sheet, the improvement which comprises:
        (A) pivot means for swingably mounting at least one of said tables on said housing, said means forming said transport path including a pair of feed rollers biased together for advancing said further sheet toward said location, said apparatus including continuously operable drive means connectable to at least one of said rollers and triggering said severing means upon the advance of said further sheet, and clutch means interposed between said drive means and said severing means; and
        (B) a lever swingably mounted on said housing and engageable with said clutch means for temporarily inactivating said severing means and engageable with at least one of said rollers for separating them to permit free movement of said further sheet along said transport path upon replacement of said roll; and
        (C) link means connecting said one of said tables with said lever for actuating said lever upon swinging movement of said one of said tables.

2. The improvement defined in claim 1 wherein said one of said tables is said first table, further comprising stop means along said input path and including a swingable bridge member extending along said path and pivotally mounted on said housing, at least one stop pin at an end of said bridge member proximal to said first table and a further stop pin carried by said bridge member at an end remote from said first table, said pins being selectively insertable into said input path for blocking the movement of a master sheet therealong upon swinging movement of said bridge member, said pins being movable on said bridge member into and out of said path whereby a pin resting upon a master sheet traversing said input path is held thereby out of said input path, and means connecting said bridge member with said lever for swinging movement of said bridge member thereby upon pivoting of said first table to bring the stop pin proximal to said first table into blocking position across said input path, said guide means including a first transport roller fixedly mounted in said housing and rotated by said drive means along said input path, and a second transport roller carried by said bridge member and movable relatively thereto for advancing said master sheets between said transport rollers along said input path.

3. The improvement defined in claim 2, further comprising indexing means co-operating with said lever for releasably locking same in a first operative position corresponding to a normal position of said first table whereby a master sheet is fed into said input path and an off-normal position wherein said first table is pivotally displaced, said positions corresponding to respective operative positions of said bridge member.

4. The improvement defined in claim 3 wherein said severing means includes a slide shiftable by said drive means in a predetermined relationship with said feed rollers, and abutment means on said slide engageable with said lever for releasing same from said indexing means.

5. The improvement defined in claim 1, further comprising stop means along said transport path for said further sheet removably insertable in said transport path for establishing the leading-edge position of said further sheet, and means coupling said lever with said stop means for insertion of said stop means into said transport path upon swinging movement of said one of said tables and said lever.

6. The improvement defined in claim 1, further comprising another supply roll removably mounted in said housing proximal to the other of said tables, said other of said tables being swingably mounted on said housing and provided with a respective lever fulcrumed on the housing and linked to said other table, another transport path in said housing for a continuous sheet of an image-receiving layer and other severing means along said other transport path for severing said layer into individual lengths, said other severing means being provided with other clutch means connecting same with said drive means and said other transport path having a respective pair of rollers for advancing said layer therealong, said other lever being engageable with the rollers of said other transport path for spreading same and with said other clutch means for disengaging said other severing means upon swinging movement of said other table into an off-normal position corresponding to removal of said other supply roll from said housing, said further sheet being fed by the first-mentioned transport path jointly with said master sheet into said exposure means, said apparatus further comprising separating means adjacent said separators for directing said master sheet upon passage through said exposure means onto said other table and for separating it from the respective further sheet, and developing means in said housing for receiving said further sheet upon separation of the master sheet therefrom and for transferring an image from said further sheet to said image-receiving sheet.

7. The improvement defined in claim 6 wherein said other transport path is provided with stop means co-operating with said other lever and insertable in said other transport path to define a leading-edge position of said image-receiving sheet upon replacement of said other supply roll.

References Cited by the Examiner

UNITED STATES PATENTS

| | | | |
|---|---|---|---|
| 2,732,778 | 1/1956 | Limberger | 95—77.5 |
| 3,076,400 | 2/1963 | Limberger | 95—75 |
| 3,143,947 | 8/1964 | Limberger | 95—75 |
| 3,182,578 | 5/1965 | Limberger | 95—77.5 |

JULIA E. COINER, *Primary Examiner.*

EVON C. BLUNK, *Examiner.*